(12) United States Patent
Wu et al.

(10) Patent No.: US 11,743,816 B2
(45) Date of Patent: Aug. 29, 2023

(54) METHOD AND APPARATUS FOR TARGET INTEGRATED ACCESS AND BACKHAUL NODE SELECTION

(71) Applicant: LENOVO (BEIJING) LIMITED, Beijing (CN)

(72) Inventors: Lianhai Wu, Beijing (CN); Prateek Basu Mallick, Dreieich (DE); Joachim Lohr, Wiesbaden (DE); Haiming Wang, Beijing (CN); Jing Han, Beijing (CN); Jie Shi, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 57 days.

(21) Appl. No.: 17/275,698

(22) PCT Filed: Sep. 21, 2018

(86) PCT No.: PCT/CN2018/107062
§ 371 (c)(1),
(2) Date: Mar. 12, 2021

(87) PCT Pub. No.: WO2020/056748
PCT Pub. Date: Mar. 26, 2020

(65) Prior Publication Data
US 2022/0030514 A1    Jan. 27, 2022

(51) Int. Cl.
*H04W 48/20* (2009.01)
*H04W 40/12* (2009.01)
(Continued)

(52) U.S. Cl.
CPC .............. *H04W 48/20* (2013.01); *H04L 45/20* (2013.01); *H04W 40/12* (2013.01); *H04W 92/24* (2013.01)

(58) Field of Classification Search
CPC ........ H04W 48/20; H04W 40/12; H04L 45/20
(Continued)

(56) References Cited

U.S. PATENT DOCUMENTS 11,039,366 B2* 6/2021 Hong ................ H04W 36/30
2017/0005913 A1  1/2017 Hampel et al.
(Continued)

FOREIGN PATENT DOCUMENTS

CN      108513323 A     9/2018
WO     2015120917 A1    8/2015

OTHER PUBLICATIONS

3GPP TSG-RAN WG2 NR AH1807 Meeting R2-1810245; Montreal, Canada, Jul. 2-6, 2018.*
(Continued)

*Primary Examiner* — Faisal Choudhury
(74) *Attorney, Agent, or Firm* — Kunzler Bean & Adamson (57) ABSTRACT

Embodiment of the present application is directed to a method and apparatus for target IAB node selection. According to an embodiment of the present application, the method includes receiving hop number information and end-to-end link quality information associated with a plurality of IAB nodes, wherein the plurality of IAB nodes include serving IAB nodes of an IAB node and at least one neighbor IAB node of the IAB node, and each of the serving IAB nodes and the at least one neighbor IAB node is associated with at least one active route. The method may further include reporting end-to-end link quality information associated with each of the at least one neighbor IAB node.

18 Claims, 5 Drawing Sheets

(51) Int. Cl.
  *H04L 45/00* (2022.01)
  *H04W 92/24* (2009.01)

(58) Field of Classification Search
  USPC .......................................................... 370/329
  See application file for complete search history.

(56) References Cited

U.S. PATENT DOCUMENTS

2021/0143959 A1* 5/2021 Xu ..................... H04W 40/22
2021/0266815 A1* 8/2021 Wei ..................... H04W 40/22

OTHER PUBLICATIONS

Vivo, Initial consideration on dynamic route selection, 3GPP TSG-RAN WG2 Meeting #101bis, R2-1804996, Apr. 16-20, 2018, R2-1804996, pp. 1-4, Sanya, China.

ZTE, Discussion on IAB node access procedure, 3GPP TSG-RAN WG2 Meeting #102, R2-1807401, May 21-25, 2018, pp. 1-5, Busan, Korea.

Vivo, IAB Topology and Routing Management, 3GPP TSG-RAN WG2 Meeting #103, R2-1811778, Aug. 20-24, 2018, pp. 1-4, Gothenburg, Sweden.

Qualcomm Incorporated, IAB Topology and Route Management, 3GPP TSG-RAN WG3 Meeting #99bis, R3-181948, Apr. 16-20, 2018, pp. 1-5, Sanya, China.

3GPP, 3rd Generation Partnership Project; Technical Specification Group Radio Access Network; Topology type, discovery and update for IAB, 3GPP R2-1808668, May 2018, pp. 1-5.

3GPP, 3rd Generation Partnership Project; Technical Specification Group Radio Access Network; Topology type, discovery and update for IAB, 3GPP R3-183189 May 2018, pp. 1-5.

International Searching Authority, "Notification of Transmittal of the International Search Report and the Written Opinion of the International Searching Authority, or the Declaration", PCT/CN2018/107062, dated Sep. 21, 2018, pp. 1-6.

* cited by examiner

METHOD AND APPARATUS FOR TARGET INTEGRATED ACCESS AND BACKHAUL NODE SELECTION

TECHNICAL FIELD

The present application generally relates to wireless communication technology, especially for target integrated access and backhaul node (IAB) selection in a wireless communication system.

BACKGROUND

In the 3rd Generation Partnership Project (3GPP), deployment of relay nodes (hereinafter referred to as "RNs") a wireless communication system is promoted. One objective for deploying RNs is to enhance coverage area of a base station (hereinafter referred to as "BS") by improving the throughput of a mobile device (also known as a user equipment (UE)) that locates in a coverage hole or far from the BS resulting in low signal quality.

In a wireless communication system employing RNs, a BS that can provide connection to at least one RN is called a donor BS. A RN is connected to a donor BS by a backhaul link. The RN may hop through one or more RNs before reaching the donor BS, or may be directly connected to the donor BS. For the new radio (NR) communication networks, 3GPP is envisioning an integrated access and backhaul (IAB) architecture for supporting multi-hop relays, wherein a donor node with multi-connectivity is also supported by an IAB node. That is, the IAB node has a plurality of active routes to the donor BS via multiple parent IAB nodes (also called "serving IAB node"). During a handover procedure and re-establishment procedure, target IAB node selection is required to facilitate the deployment and application of the NR communication networks.

SUMMARY OF THE APPLICATION

An embodiment of the present application provides a method, including: receiving hop number information and end-to-end link quality information associated with a plurality of IAB nodes, wherein the plurality of IAB nodes include serving IAB nodes of an IAB node and at least one neighbor IAB node of the IAB node, and each of the serving IAB nodes and the at least one neighbor IAB node is associated with at least one active route. The method may further include reporting end-to-end link quality information associated with each of the at least one neighbor IAB node.

Another embodiment of the present application provides an apparatus, including: at least one receiver and at least one transmitter. The at least one receiver may receive hop number information and end-to-end link quality information associated with a plurality of IAB nodes. Wherein the plurality of IAB nodes includes serving IAB nodes of an IAB node and at least one neighbor IAB node of the IAB node, and each of the serving IAB nodes and at least one neighbor IAB node is associated with at least one active route. The at least one transmitter may report end-to-end link quality information associated with each of the at least one neighbor IAB node.

Yet another embodiment of the present application provides an apparatus, including: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present application with the at least one receiver, the at least one transmitter and the at least one processor.

Embodiments of the present application provide a novel method and apparatus for target IAB node selection, especially for an IAB node with multi-connectivity, which is desired by the industry.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Figure 1:
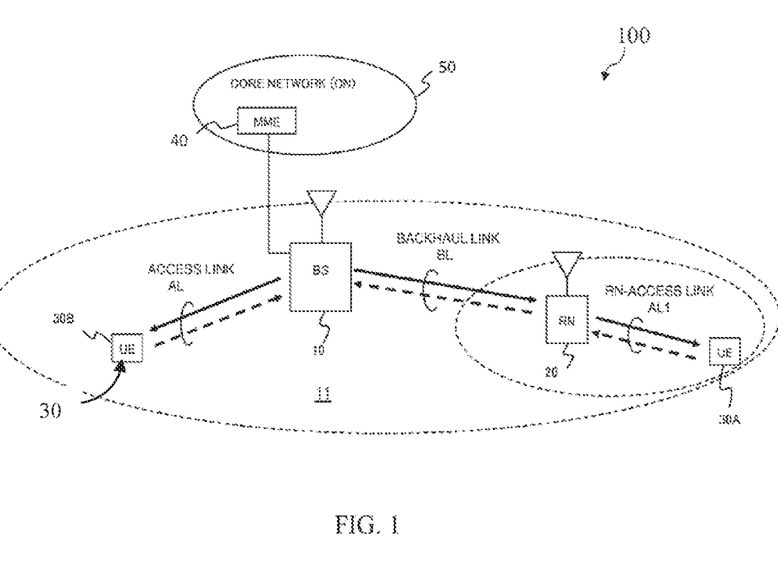
FIG. 1 illustrates a schematic view of a wireless communication system employing RNs according to an embodiment of the present application.

Relaying function enables an operator to improve and extend the coverage of a base station (BS) by having relay node (RN) wirelessly connected to the BS. FIG. 1 illustrates a schematic view of a wireless communication system 100 employing RNs 20 according to an embodiment of the present application.

Referring to FIG. 1, the wireless communication system 100 with relaying function includes a plurality of nodes, including at least one BS 10, at least one RN 20, and a plurality of UEs 30 including UEs 30A and 30B. Although only one BS 10, one RN 20 and two UEs 30 are shown for simplicity, it should be noted that the wireless communication system 100 may further include more BSs 10, RNs 20, and UEs 30.

The BS 10 operates under the control of a mobility management entity (MME) 40 and is connected to a core network (CN) 50. The CN 50 also includes a home subscriber server (HSS) (not shown), which is in communication with the MME 40. The BS 10 may be based, for example, on the standards of long-term evolution (LTE), LTE-Advanced (LTE-A), new radio (NR), or other suitable standards. For example, the BS 10 may be an eNB or a gNB, and may define one or more cells 11. The RNs 20 may be conventional relay nodes or integrated access and backhaul (IAB) nodes. The UEs 30 may be a computing device, a wearable device, or a mobile device, etc. Persons skilled in the art should understand that as the 3GPP and the communication technology develop, the terminologies recited in the specification may change, which should not affect the principle of the application.

The BS 10 provides radio protocol Layer-1, i.e., physical layer to Layer-3, i.e., radio resource control (RRC) layer connections to the UE 30B and the RN 20 through an access link (AL) and a backhaul link (BL), respectively. In some embodiments, the RN 20 may provide radio protocol Layer-1 to Layer-3 connections to the UE 30A through a RN-access link ALL in some embodiments, the RN 20 may provide radio protocol Layer-1 to Layer-2 connections to the UE 30A through the AL1. In the case that the RN 20 is connected to the BS 10 by the BL, the BS 10 is the donor BS of the RN 20. Although FIG. 1 shows that the donor BS 10 and the RN 20 are respectively connected to a single UE, both the donor BS 10 and RN 20 are capable of providing connections to multiple UEs 30.

Evolved Universal Terrestrial Radio Access Network (E-UTRAN) supports relaying by having a RN 20 wirelessly connect to an eNB 10 serving the RN, called Donor eNB (DeNB), via a modified version of the E-UTRA radio interface, i.e. the BL, also referred to as the Un interface. The radio interface that provides radio protocol connection between RN 20 and the UE 30 is referred to as the Uu interface. The relaying function and use of RN/DeNB entities in a network is transparent to the operations of the UEs 30 connected. However, wireless backhaul links are vulnerable to blockage, e.g., due to moving objects such as vehicles, due to seasonal changes (foliage), or due to infrastructure changes (new buildings). Such vulnerability also applies to physically stationary RN nodes.

An integrated access and backhaul (IAB) architecture supporting multi-hop relays and multi-connectivity is envisioned for NR, for example 5G communication networks, wherein single-hop should be considered as a special case of multi-hop, and single-connectivity should be considered as a special case of multi-connectivity. Under the IAB architecture, the RNs 20 is called "IAB nodes," and the donor BS 10 or DeNB is called "IAB donor" (hereafter also called "donor node").

In the case that a backhaul link is blocked by moving objects, an IAB node 20 can be switched to another serving IAB node by a donor node 10 via a route switch procedure. Sometime, all the connections may be blocked, and the IAB node 20 has to initialize a route re-establishment procedure. Both the route switch procedure and route re-establishment procedure need to select a target IAB node for the IAB node.

According to an embodiment of the present application, the basic stages of a method for target IAB node selection may be summarized as: receiving hop number information and end-to-end link quality information associated with a plurality of IAB nodes, wherein the plurality of IAB nodes include serving IAB nodes of an IAB node and at least one neighbor IAB node of the IAB node, and each of the serving IAB nodes and at least one neighbor IAB node is associated with at least one active route. The method may further include reporting end-to-end link quality information associated with each of the at least one neighbor IAB node.

In an example embodiment of the present application, this method can be implemented in an IAB node with multi-connectivity.

In addition, embodiments of the present application also provide apparatuses for target IAB node selection. According to an embodiment of the present application, the basic structure of the apparatus can be summarized as: at least one receiver and at least one transmitter. The at least one receiver may receive hop number information and end-to-end link quality information associated with a plurality of IAB nodes. Wherein the plurality of IAB nodes includes serving IAB nodes of an IAB node and at least one neighbor IAB node of the IAB node, and each of the serving IAB nodes and at least one neighbor IAB node is associated with at least one active route. The at least one transmitter may report end-to-end link quality information associated with each of the at least one neighbor IAB node, in an example embodiment of the present application, the apparatus can be an IAB node with multi-connectivity.

More details on the embodiments of the present application will be illustrated in the following text in combination with the appended drawings.

Figure 2:
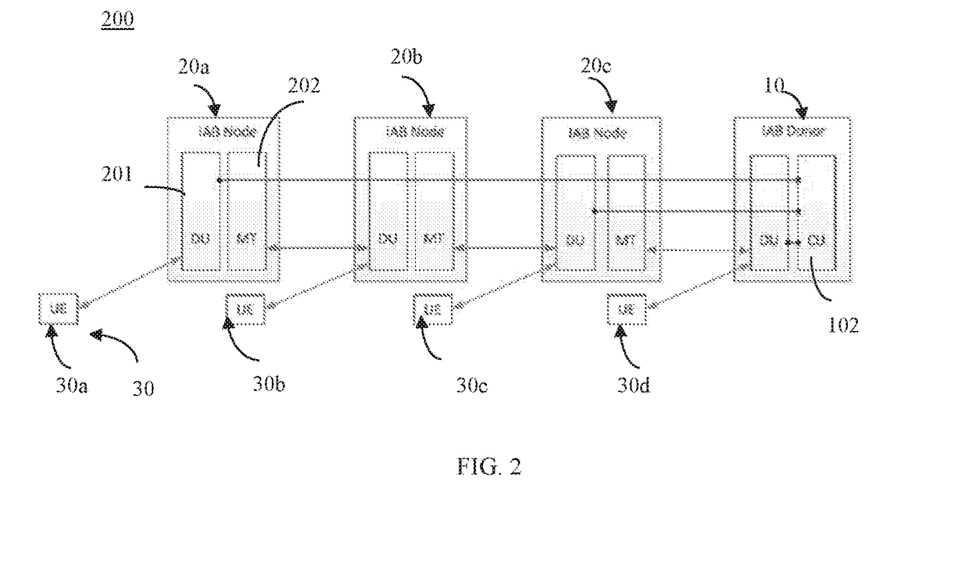
FIG. 2 illustrates a block diagram of a wireless communication system under the IAB architecture according to an embodiment of the present application.

FIG. 2 illustrates a block diagram of a wireless communication system 200 under the IAB architecture according to an embodiment of the present application. For illustrating the principle of the present application in a clear and concise manner, only one example relay route of IAB node 20a hopping through IAB node 20b and IAB node 20c is shown. Persons skilled in the art should know that in a real communication system, there can be more relay routes defined by more nodes etc., and can clearly determine their relationship and how they operate based on the disclosure and teaching of the embodiment of the present application.

As shown in FIG. 2, in the wireless communication system 200, a first IAB node 20a can reach a donor node 10 via hopping through a second IAB node 20b and a third IAB node 20c. Specifically, the first IAB node 20a can be directly connected to the second IAB node 20b, the second IAB 20b can be directly connected to the third IAB node 20c, and the third IAB node 20c can be directly connected to the donor node 10. That is, the third IAB node 20c can be a serving IAB node of the second IAB node 20b, and the second IAB node 20b can be a serving node of the first IAB node 20a. Both the second IAB node 20b and third IAB node 20c are upstream nodes for the first IAB node 20a, and both the first IAB node 20a and second IAB node 20b are downstream nodes of the third IAB node 20c. Each IAB node 20 can directly connect with at least one UE 30. For example, a first UE 30a can be connected to the first IAB node 20a, a second UE 30b can be connected to the second IAB node 20b, and a third UE 30c can be connected to the third IAB node 20c. At least one UEs 30, for example the fourth UE 30d can be directly connected to the donor node 10.

In addition, each of the IAB nodes 20a, 20b, 20c may include a distributed unit (DU) 201 and a mobile termination (MT) 202, Accordingly, each of the IAB nodes 20a, 20b, 20c may be connected to an upstream IAB node or a donor node 10 via the MT 202, and may be connected to the UEs 30 and a downstream IAB node via the DU 201. For example, for the second IAB node 20b, it is connected to its upstream nodes, for example the third IAB node 20c via the MT 202, and is connected to its UEs and downstream nodes, for example, the second UE 30b and IAB node 20a via the DU 201. The donor node 10 may act as a serving IAB node, and include a DU 201 to support UEs 30 and MTs 202 of downstream IAB nodes. The donor node 10 may further include a centralized unit (CU) 102 for the DUs 201 of all IAB nodes 20 and for its own DU 201.

Figure 3:
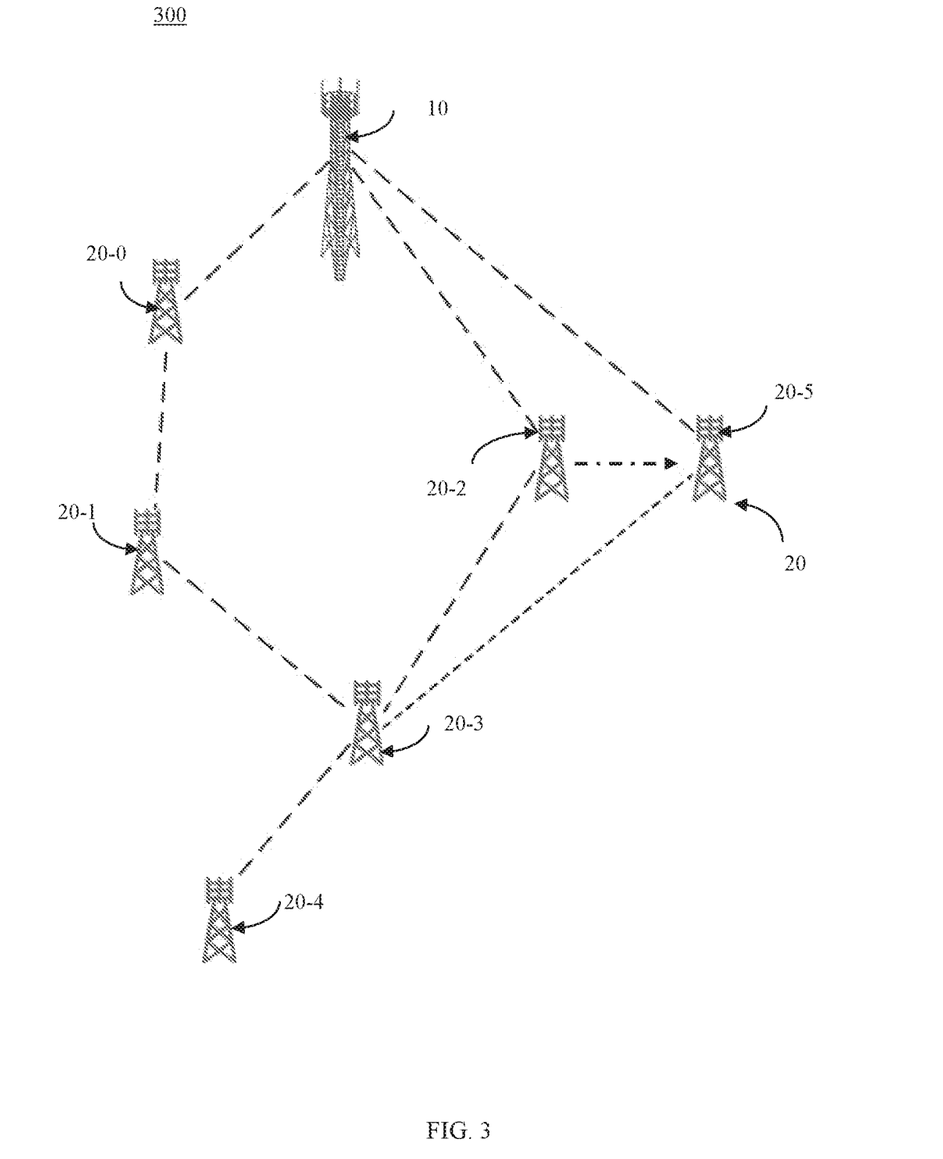
FIG. 3 illustrates an application scenario involving target IAB node selection according to an embodiment of the present application.

FIG. 3 illustrates an application scenario involving target IAB node selection according to an embodiment of the present application, especially involving target IAB node selection for an IAB node with multi-connectivity, for example IAB node 20-3. The application scenario can also happen in a wireless communication system as illustrated in FIGS. 1 and 2.

As shown in FIG. 3, in an example application scenario of the present application, a wireless communication system 300 includes a donor node 10, and a plurality of IAB nodes 20 including IAB nodes 20-0 to 20-5. The donor node 10 may be a BS providing at least one relay connection to at least one IAB node 20, and also is called "IAB donor." The IAB node 20 may be a relay node under the IAB architecture. It should be noted that the wireless communication system 300 is shown for illustrating the principle of the present application in a clear and concise manner. Persons skilled in the art should know that in a real communication system, there can be more relay routes defined by more nodes, and can clearly determine their relationship and how they operate based on the disclosure and teaching of the embodiment of the present application.

In FIG. 3, it is assumed for simplicity that IAB node 20-0, IAB node 20-2 and IAB node 20-5 are directly connected to the same donor node 10, while IAB node 20-3 and IAB node 20-4 are connected to the same donor node 10 by relay connections. However, in some embodiments of the present application, IAB nodes 20-0, 20-2 and 20-5 may be connected to different donor nodes 10. In addition, IAB node 20-3 and IAB node 20-4 may also be directly or indirectly connected to other serving IAB node or donor node(s) 10. That is, each of the plurality of IAB nodes 20 in FIG. 3 is associated with at least one active route. "Active route" of a node means this node is allowed to transmit or receive data in this route.

Specifically, referring to FIG. 3, according to an embodiment of the present application, IAB node 20-3 has a plurality of active routes to the donor node 10, wherein a first active route is reaching the donor node 10 by hopping through IAB node 20-2 and a second active route is reaching the donor node 10 by hopping through IAB node 20-0 and IAB node 20-1. In the first active route, IAB node 20-2 is the serving node of IAB node 20-3. In the second active route, IAB node 20-1 is the serving IAB node of IAB node 20-3. Accordingly, IAB node 20-4, which is a child IAB node of IAB node 20-3, also has a plurality of active routes to the donor node 10 by hopping through IAB node 20-3 and the active routes of IAB 20-3. Although IAB node 20-5 is not connected with IAB node 20-3, IAB node 20-5 can be a neighbor IAB node of IAB node 20-3 in the case that IAB node 20-5 can be measured by IAB 20-3.

When the quality of part or all backhaul links of an IAB node 20, for example IAB node 20-3 decreases, a route switch procedure or re-establish procedure is needed for the IAB node 20.

Figure 4:
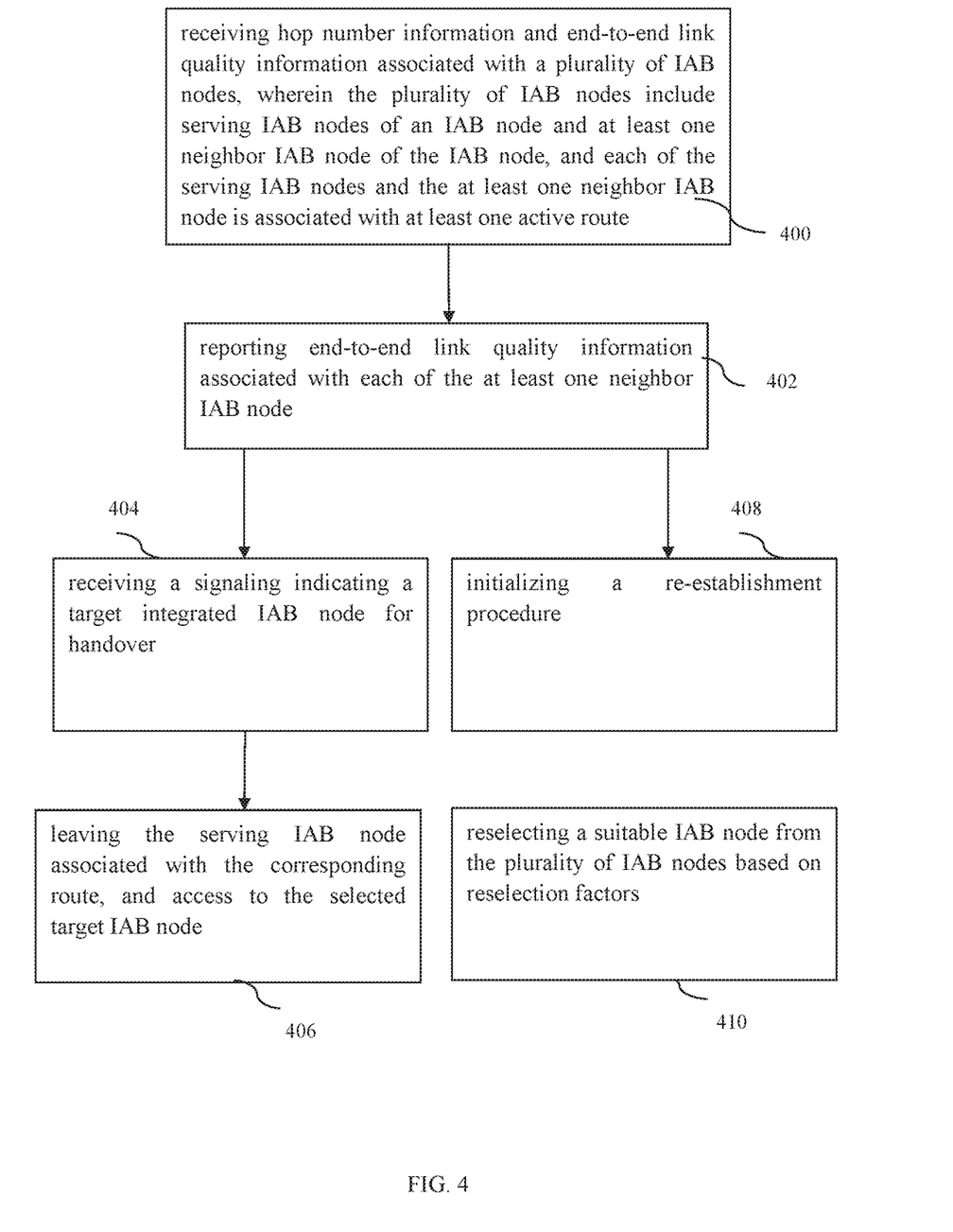
FIG. 4 illustrates an exemplary procedure for target IAB node selection according to an embodiment of the present application.

FIG. 4 illustrates an exemplary procedure for target IAB node selection according to an embodiment of the present application. This procedure can be performed at least under the application scenario illustrated in FIG. 3, for example by an IAB node 20 with multi-connectivity, i.e., an IAB node 20 having a plurality of active routes like IAB node 20-3.

As shown in FIG. 4, in step 400, hop number information and end-to-end link quality information associated with a plurality of IAB nodes 20 (hereafter called as "the plurality of candidate IAB node 20" for clarity) can be received, for example by an IAB node (hereafter called as "concerned IAB node" for clarity). Wherein in a view of an IAB node 20, the end-to-end link quality means the link quality of the route between the IAB node 20 and a donor node 10. The hop number information can be a list of hop number of each active route, or a minimum of the hop numbers of all the active routes. The end-to-end link quality may be a minimum reference signal receiving power (RSRP) of a route, harmonic mean of RSRP, Shannon capacity of the link, or IAB node capability, etc.

The hop number information and end-to-end link quality information may be broadcast by the plurality of candidate IAB nodes 20 according to an embodiment of the present application. The plurality of candidate IAB nodes 20 can include serving IAB nodes of the concerned IAB node 20 and at least one neighbor IAB node of the concerned IAB node 20. Each of the serving IAB nodes and the at least one IAB node is associated with at least one active route.

For example, in the embodiment shown in FIG. 3, the plurality of candidate IAB nodes 20 can be IABs 20-0, 20-1, 20-2 and 20-5, wherein IABs 20-0, 20-1, 20-2 are serving IAB nodes of IAB node 20-3 respectively associated with the first active route and second active route; and IAB node 20-5 is the neighbor IAB node of IAB node 20-3 due to being measured by IAB node 20-3. IAB node 20-3 can receive hop number information and end-to-end link quality information associated with serving IAB nodes 20-0, 20-1 and 20-2 and neighbor IAB node 20-5, which can be broadcast by the serving IAB nodes 20-0, 20-1 and 20-2 and neighbor IAB node 20-5.

In an embodiment of the present application, the received hop number information may include the hop number of each active route of the concerned IAB node 20, or a minimum of the hop number of a plurality of active routes of the concerned IAB node 20. In this case, the received hop number information may be broadcast by e serving IAB node of the concerned IAB node 20 or can be configured by a donor node 10 of the concerned IAB node 20 via a dedicated signaling. In an example, for IAB node 20-3 having two active routes, it may receive a list of the hop number of each active route from the donor node 10, which can be expressed as {2, 3}. That means, for the two active routes of IAB node 20-3, one active route has two hops while the other active route has three hops. In another example, IAB node 20-3 may just receive a minimum of the hop number of the two active routes, i.e., 2.

According to an embodiment of the present application, the received hop number information may include the hop number of each active route of the neighbor IAB node, or a minimum of the hop number of a plurality of active routes of the neighbor IAB node. The received hop number information may be broadcast by the neighbor IAB node. Still referring to FIG. 3, for IAB node 20-3, it may receive the hop number of each active route of the neighbor IAB node 20-5 in an embodiment of the present application. In the case that the neighbor IAB node 20-5 has a plurality of active routes, IAB node 20-3 may receive a minimum of the hop number of a plurality of active routes of the neighbor IAB node 20-5.

According to an embodiment of the present application, the received end-to-end link quality information may include a minimum end-to-end link quality, for example a minimum RSRP of a corresponding active route. In another embodiment of the present application, the received end-to-end link quality information may include a maximum of the end-to-end link quality of a plurality of active routes associated with one of the plurality of candidate IAB nodes 20.

In yet another embodiment of the present application, the received end-to-end link quality information may include harmonic mean of end-to-end link quality in the case that different bearings are transmitted on different routes of the concerned IAB node 20 with multi-connectivity, and coefficients for harmonic mean depend on the data ratio between the different routes.

The received end-to-end link quality information may be broadcast by the plurality of candidate IAB nodes 20, for example serving IAB node of the concerned IAB node 20. In another embodiment, the received end-to-end link quality information may be configured by a donor node 10 of the concerned IAB node 20 via a dedicated signaling. For example, after receiving the measurement results of end-to-end link quality from all associated IAB nodes 20, the donor node 10 can calculate the end-to-end link quality, e.g. minimum RSRP of each route. Then, the donor node 10 can configure the end-to-end link quality for each IAB node 20 via dedicated signaling. The corresponding IAB node 20 can receive the end-to-end link quality configured by the donor node 10.

In step 402, end-to-end link quality information associated with each of the at least one neighbor IAB node may be reported, for example by the concerned IAB node 20. In an embodiment of the present application, the hop number information associated with each of the at least one neighbor IAB node can also be reported. For example, IAB node 20-3 may directly report the end-to-end link quality information and hop number information associated with IAB node 20-5 to the donor node 10. IAB node 20-3 may also report the end-to-end link quality information and hop number information associated with IAB node 20-5 to its serving IAB node, i.e., IAB nodes 20-1 and 20-2.

In an embodiment of the present application, the concerned IAB node 20 may broadcast its own hop number information based on the received hop number information associated with the serving IAB nodes. For example, for IAB node 20-3, it may broadcast its own hop number information, for example, expressed as {2, 3}. After receiving the hop information broadcast by IAB node 20-3, IAB node 20-4 may calculate its own hop information based on the received hop information of IAB node 20-3, and broadcast its own hop number information, for example in a list expressed as {3, 4}. In an embodiment of the present application, IAB node 20-3 may receive the hop number of 2 from IAB node 20-1 in the second active route, and then broadcast its own hop number of 3 associated with corresponding active route.

In an embodiment of the present application, the concerned IAB node 20 may broadcast its own end-to-end link information based on the received end-to-end information associated with the serving IAB nodes. For example, for IAB node 20-3, it may receive the minimum RSRP of IAB node 20-1 and IAB node 20-2, and broadcast the end-to-end link quality of each active route, e.g., {Min RSRP1, Min RSRP2}. In another example, IAB node 20-3 may broadcast the maximum of all candidate routes, e.g. Maximum{Min RSRP1, Min RSRP2}. In the case that different bearings are transmitted on different routes of IAB node 20-3, IAB node 20-3 may broadcast harmonic mean of link quality. The coefficient for harmonic mean of link quality depends on the data ratio between different routes, e.g. a1{Min RSRP1}+a2{Min RSRP2}, wherein a1 and a2 depend on the data ratio between two active routes of IAB node 20-3.

In addition to the hop number information and end-to-end link quality information, other assistant information for target IAB node selection can also be received, reported or broadcast. The other assistant information may include load information associated with the serving IAB node and neighbor IAB node etc. For example, in the case that a trigger condition is met, IAB node 20-3 may report the load information to the donor node 10. The load information may include a load status indicator of the concerned IAB node. The load status indicator may indicate a load level of a plurality of load levels of the concerned IAB node. For example, the load status indicator may indicate a low load, a medium load, or a high load of the concerned IAB node. The trigger condition may be configured by the donor node 10, and may be a change in the load status indicator in an embodiment of the present application. In another example, IAB 20-3 may report information for calculating reselection factors for target IAB node selection during a re-establishment procedure.

The donor node 10 may evaluate whether a route switch procedure is needed for the concerned IAB node 20 in each active route based on the corresponding reported hop number information, end-to-end link quality information, load information etc. The donor node 10 may select a target IAB node for handover from a plurality of candidate IAB nodes in the case that a route switch procedure is needed in an active route. Accordingly, in step 404, a handover command may be received by the concerned IAB node. A signalling indicating a target IAB node for handover can also be received. Then in step 406, the concerned IAB node 20 may leave the serving IAB node associated with the corresponding route, and access the target IAB node selected by the donor node 10. For example, for IAB node 20-3, the donor node 10 may perform a route switch procedure to switch the active route via IAB node 20-2 to a route via IAB node 20-5. After receiving the handover command, IAB node 20-3 may leave serving IAB 20-2 and access target IAB node 20-5.

In an embodiment of the present application, all active routes of the concerned IAB node 20 may be broken. The concerned IAB node 20 has to re-establish at least one route with the donor node 10. In step 408, a re-establishment procedure may be initialized. In step 410, a suitable target IAB node from the plurality of candidate IAB node 20 based on reselection factors may be reselected in response to initializing a re-establishment procedure. The reselection factors can be calculated based on the received hop number information and end-to-end link quality information.

Specifically, the IAB node 20 initializing the re-establish procedure, for example IAB 20-3 may rank the candidate IAB nodes 20, for example 20-1, 20-2 and 20-5 in order to decrease the reselection factor. Then, IAB node 20-3 may select the one which has the reselection factors both for upstream and downstream of the re-established route above a threshold configured by the donor node 10. The reselection factors can be expressed as:

$$\text{Reselection factor} = a * f(\text{Num\_Hops}) + b * g(\text{Load}) + c * h(\text{E2E\_Quality})$$

Wherein, f(Num_Hops) is a function related to the hop number of a candidate IAB node, "Num_Hops"; g(Load) is a function related to load of the candidate IAB node, "Load"; and h(E2E_Quality) is a function related to the end-to-end link quality of the candidate IAB node, "E2E_Quality." In addition, "Num_Hops" is not larger than a maximum of hop number configured by a donor node 10 of the concerned IAB node or the serving IAB node, and the maximum of hop number configured by the donor node 10 is a constant. "Load" is not larger than a maximum of load of the candidate route configured by the donor node 10 or the serving IAB node, and the maximum of load of the candidate route is a constant. "E2E_Quality" is larger than a minimum of end-to-end link quality of the candidate route configured by the donor node 10 or the serving IAB node, and the minimum of end-to-end link quality of the candidate route is also a constant. Coefficients a, b and c can also be configured by the donor node 10, wherein a, b and c are not less than zero and not larger than 1.

Embodiments of the present application also provide an apparatus for target IAB node selection, which can at least implement a method for target IAB node selection according to embodiment of the present application.

Figure 5:
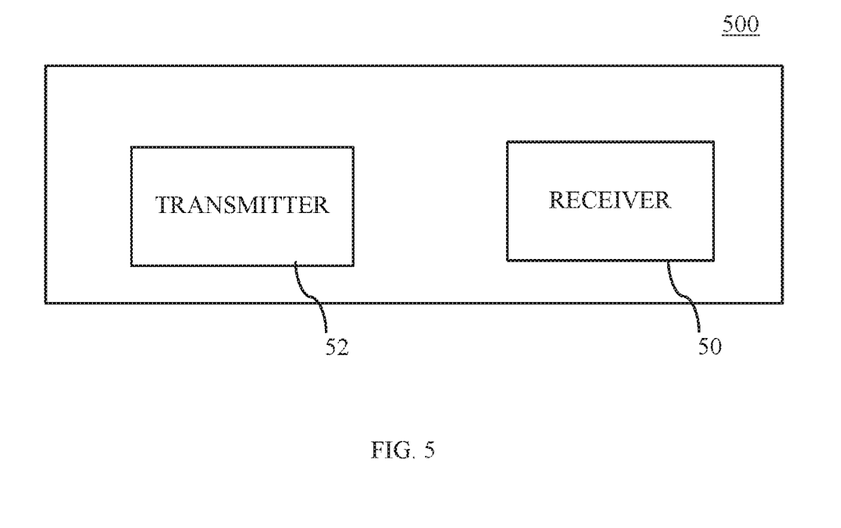
FIG. 5 illustrates a block diagram of an apparatus for target IAB node selection according to an embodiment of the present application.

FIG. 5 illustrates a block diagram of an apparatus 500 for target IAB node selection according to an embodiment of the present application.

As shown in FIG. 5, the apparatus 500 includes at least one receiver 50 and at least one transmitter 52. The at least one receiver 50 may receive hop number information and end-to-end link quality information associated with a plurality of candidate IAB nodes 20. Wherein the plurality of candidate IAB nodes 20 includes serving IAB nodes of a concerned IAB node and at least one neighbor IAB node of the concerned IAB node, and each of the serving IAB nodes and at least one neighbor IAB node is associated with at least one active route. The at least one transmitter 52 may report end-to-end link quality information associated with each of the at least one neighbor IAB node. In an example embodiment of the present application, the apparatus 500 can be an IAB node with multi-connectivity.

Figure 6:
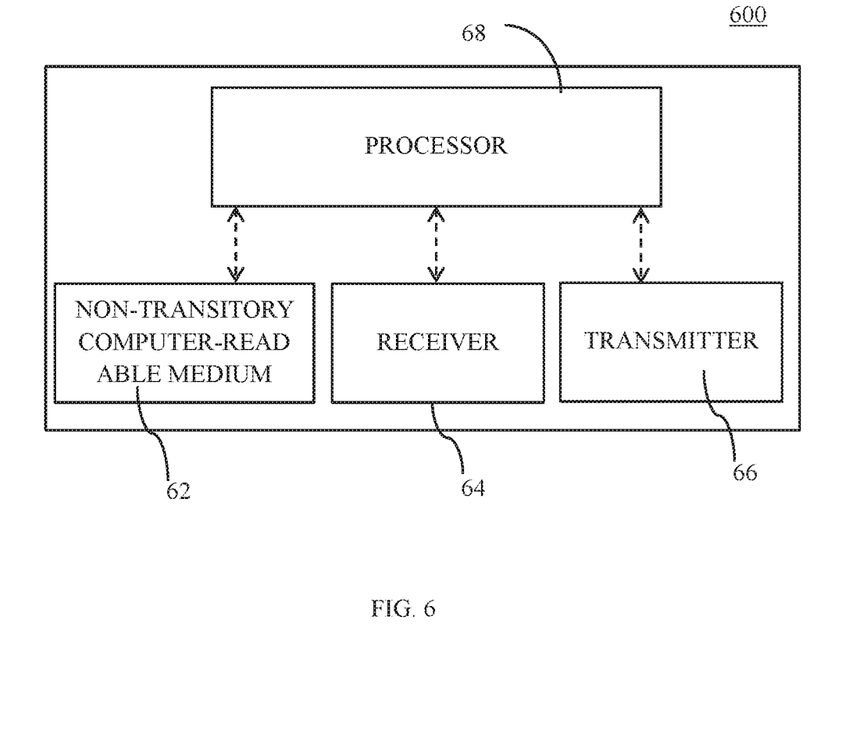
FIG. 6 illustrates a block diagram of an apparatus for target IAB node selection according to an embodiment of the present application.

FIG. 6 illustrates a block diagram of an apparatus 600 for target IAB node selection according to another embodiment of the present application.

As shown in FIG. 6, an apparatus 600 may include at least one non-transitory computer-readable medium 62 having computer executable instructions stored therein; at least one receiver 64; at least one transmitter 66; and at least one processor 68 coupled to the at least one non-transitory computer-readable medium 62, the at least one receiver 64 and the at least one transmitter 66. The computer executable instructions are programmed to implement a method for target IAB node selection according to an embodiment of the present application with the at least one receiver 64, the at least one transmitter 66 and the at least one processor 68.

In addition, although target IAB node selection is illustrated based on a IAB node with multi-connectivity, persons skilled in the art should understand that the embodiments of the present application are also adaptable for an IAB node with a single-connectivity. Single-connectivity should be considered as a special case of multi-connectivity.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

In this document, the terms "comprises," "comprising," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed is:

1. A method comprising:
   receiving hop number information and end-to-end link quality information associated with a plurality of integrated access and backhaul nodes, wherein the plurality of integrated access and backhaul nodes include serving integrated access and backhaul nodes of an integrated access and backhaul node and at least two neighbor integrated access and backhaul nodes of the integrated access and backhaul node, and each of the serving integrated access and backhaul nodes and the at least two neighbor integrated access and backhaul nodes is associated with at least one active route; and
   reporting end-to-end link quality information associated with each of the at least two neighbor integrated access and backhaul nodes, wherein the received hop number information comprises a hop number for each route of a plurality of active routes of the integrated access and backhaul node received as a list of hop numbers from each neighbor integrated access and backhaul node of the at least two neighbor integrated access and backhaul nodes.

2. The method of claim 1, wherein the received hop number information comprises:
   a minimum hop number of the plurality of active routes of the integrated access and backhaul node.

3. The method of claim 1, further comprising:
   receiving a coefficient related to calculation of hop number, a coefficient related to calculation of load, a coefficient related to calculation of end-to-end link quality, or a combination thereof.

4. The method of claim 1, comprising:
   receiving a maximum hop number, a maximum load, a minimum end-to-end link quality, or a combination thereof.

5. The method of claim 1, wherein the received hop number information and the received end-to-end link information is configured by a donor node of the integrated access and backhaul node via a dedicated signaling or is broadcast by the plurality of integrated access and backhaul nodes.

6. The method of claim 1, comprising:
   reporting hop number information associated with the at least two neighbor integrated access and backhaul nodes.

7. The method of claim 1, wherein the integrated access and backhaul node broadcasts its own hop number information based on the received hop number information associated with the serving integrated access and backhaul nodes.

8. The method of claim 1, wherein the integrated access and backhaul node broadcasts its own end-to-end link quality information based on the received end-to-end link quality information of the serving integrated access and backhaul nodes.

9. The method of claim 1, wherein the received end-to-end link quality information comprises a maximum of the end-to-end link quality of a plurality of active routes associated with one of the plurality of integrated access and backhaul nodes.

10. The method of claim 1, wherein the received end-to-end link quality information comprises harmonic mean of end-to-end link quality in the case that different bearings are transmitted on different routes, and coefficients for harmonic mean depend on the data ratio between the different routes.

11. The method of claim 1, comprising receiving a signaling indicating a target integrated access and backhaul node for handover, wherein the target integrated access and backhaul node is selected from the at least two neighbor integrated access and backhaul nodes.

12. The method of claim 1, comprising reselecting a suitable integrated access and backhaul node from the plurality of integrated access and backhaul nodes based on reselection factors in response to initializing a re-establishment procedure, wherein the reselection factors are calculated based on the received hop number information and end-to-end link quality information.

13. The method of claim 12, wherein the reselection factors are expressed as:

$$\text{Reselection factor} = a * f(\text{Num\_Hops}) + b * g(\text{Load}) + c * h(\text{E2E\_Quality})$$

Wherein, f(Num_Hops) is a function related to the hop number of a candidate integrated access and backhaul node, Num_Hops;

g(Load) is a function related to load of the candidate integrated access and backhaul node, Load; and h(E2E_Quality) is a function related to the end-to-end link quality of the candidate integrated access and backhaul node, E2E_Quality;

wherein,

Num_Hops is not larger than a maximum of hop number configured by a donor node of the integrated access and backhaul node or the serving integrated access and backhaul node;

Load is not larger than a maximum of load of the candidate route configured by the donor node or the serving integrated access and backhaul node; and E2E_Quality is larger than a minimum of end-to-end link quality of the candidate route configured by the donor node or the serving integrated access and backhaul node; and wherein coefficients a, b and c are not less than zero and not larger than one.

14. An apparatus comprising:

at least one receiver that receives hop number information and end-to-end link quality information associated with a plurality of integrated access and backhaul nodes, wherein the plurality of integrated access and backhaul nodes include serving integrated access and backhaul nodes of an integrated access and backhaul node and at least two neighbor integrated access and backhaul nodes of the integrated access and backhaul node, and each of the serving integrated access and backhaul nodes and at least two neighbor integrated access and backhaul nodes is associated with at least one active route; and at least one transmitter that reports end-to-end link quality information associated with each of the at least two neighbor integrated access and backhaul nodes, wherein the received hop number information comprises a hop number for each route of a plurality of active routes of the integrated access and backhaul node received as a list of hop numbers from each neighbor integrated access and backhaul node of the at least two neighbor integrated access and backhaul nodes.

15. The apparatus of claim 14, wherein the received hop number information comprises:

a minimum hop number of the plurality of active routes of the integrated access and backhaul node.

16. The apparatus of claim 14, wherein, the at least one receiver receives a coefficient related to calculation of hop number, a coefficient related to calculation of load, a coefficient related to calculation of end-to-end link quality, or a combination thereof.

17. The apparatus of claim 14, wherein, the at least one receiver receives at least one of a maximum hop number, a maximum load and a minimum end-to-end link quality.

18. The apparatus of claim 14, wherein the received hop number information and the received end-to-end link information is configured by a donor node of the integrated access and backhaul node via a dedicated signaling or is broadcast by the plurality of integrated access and backhaul nodes.

* * * * *